Aug. 29, 1950     H. J. FINDLEY     2,520,678
WINDSHIELD CLEANER MECHANISM
Filed July 10, 1944     3 Sheets-Sheet 1
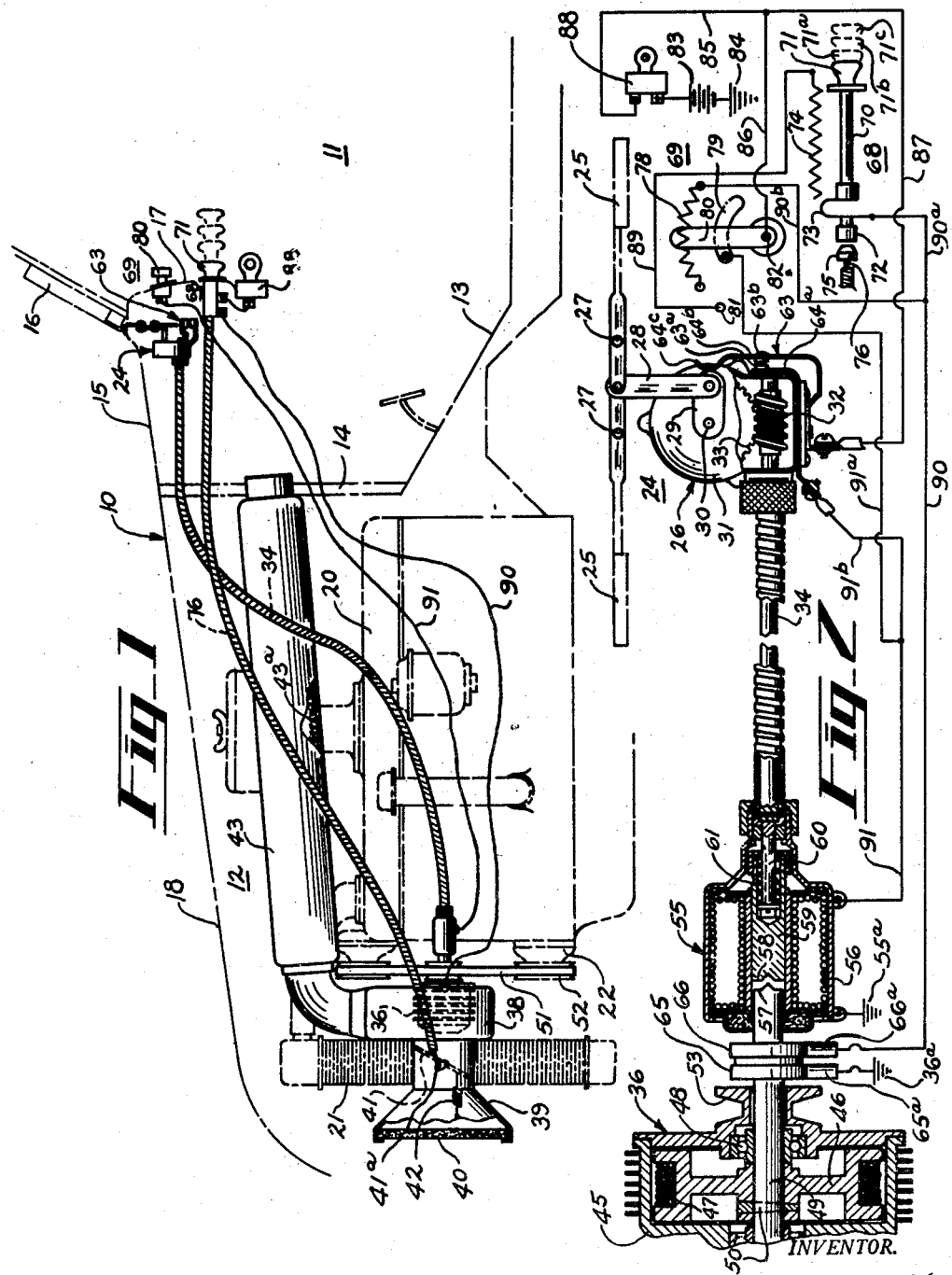
INVENTOR.
HOWARD J. FINDLEY
BY
Kurs Hudson Boughton & Williams
ATTORNEYS Aug. 29, 1950    H. J. FINDLEY    2,520,678
WINDSHIELD CLEANER MECHANISM
Filed July 10, 1944    3 Sheets-Sheet 2
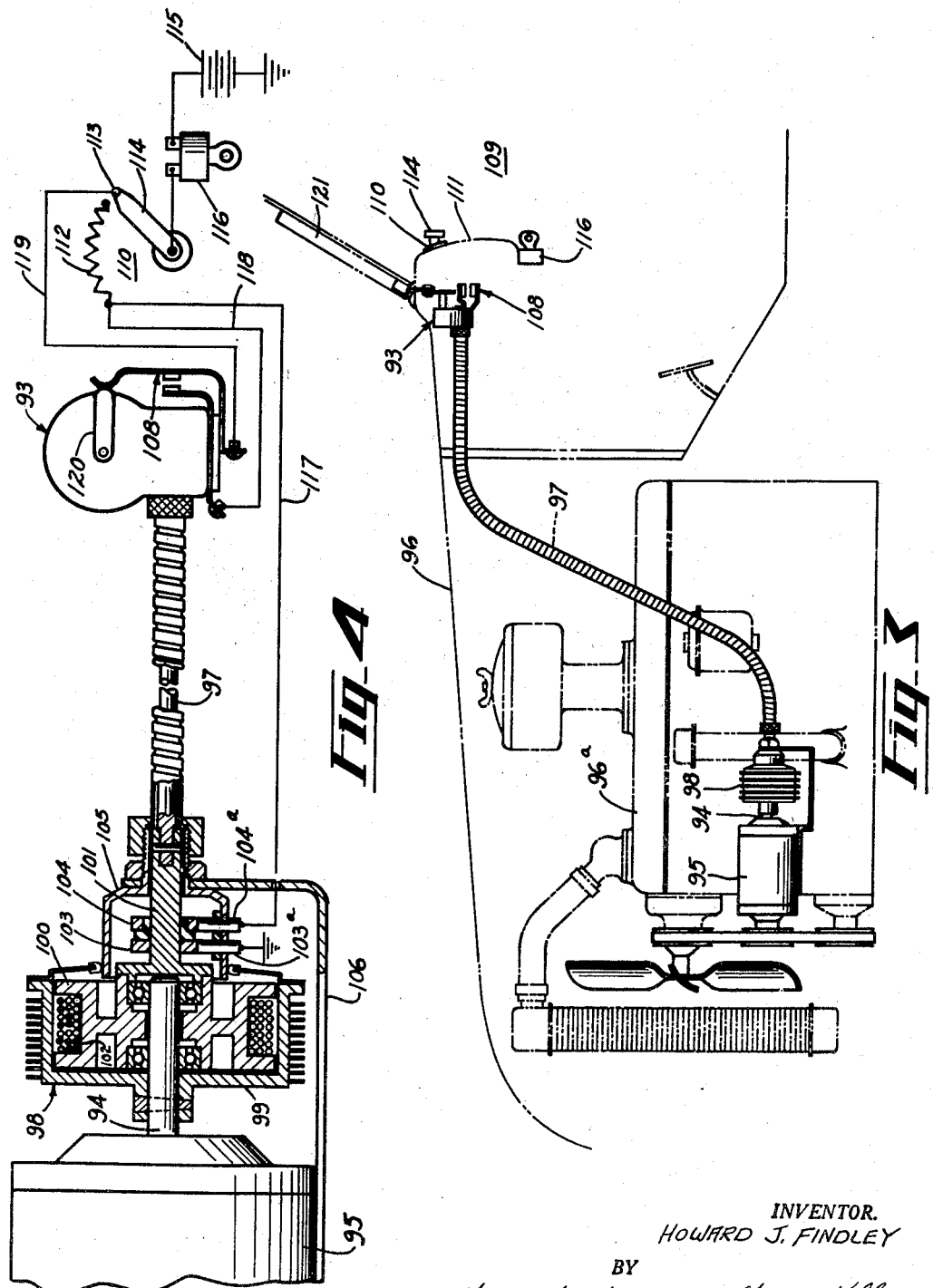
INVENTOR.
HOWARD J. FINDLEY
BY
Kwis Hudson Boughton & Williams
ATTORNEYS

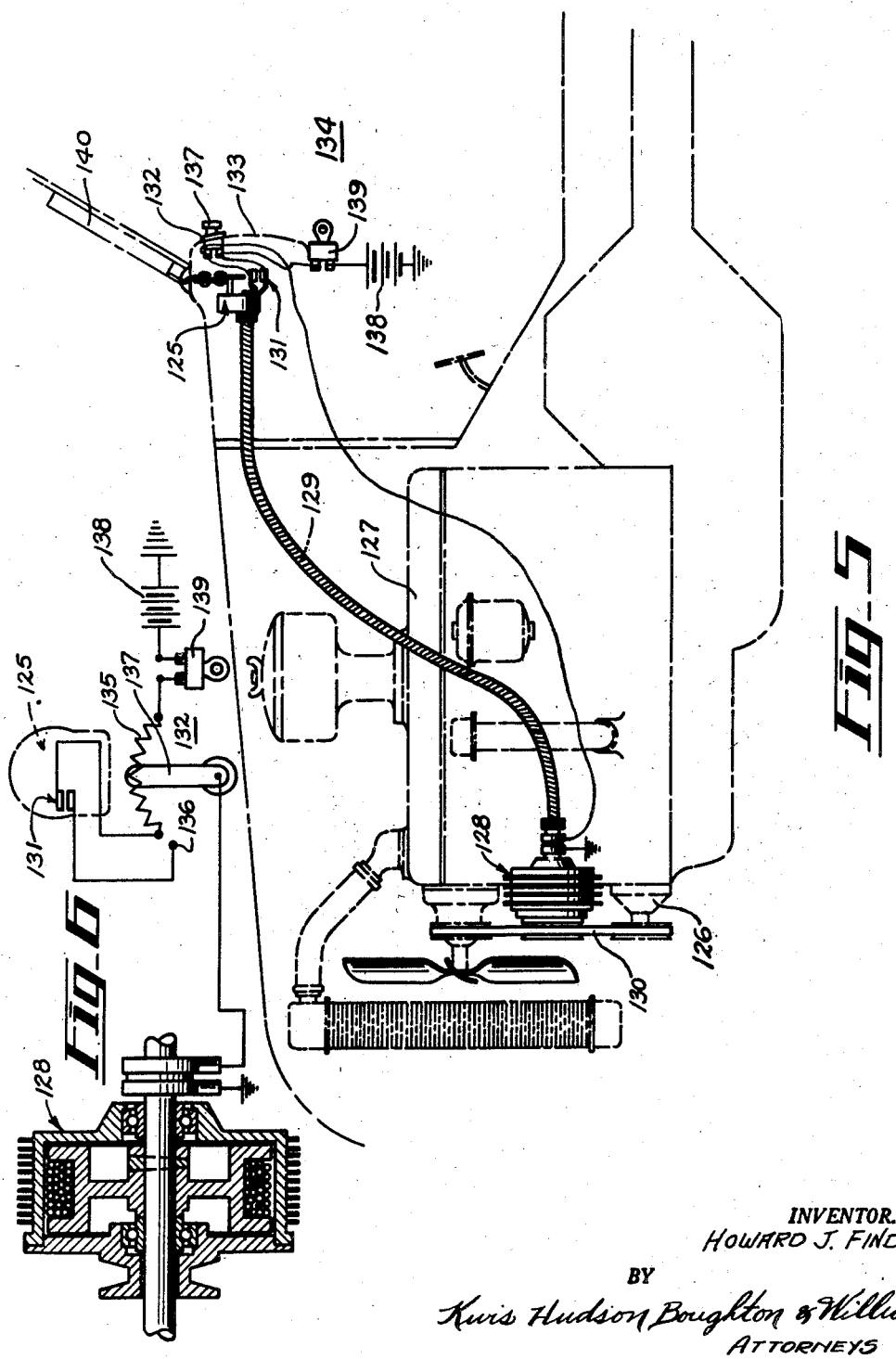

Patented Aug. 29, 1950

2,520,678

UNITED STATES PATENT OFFICE 2,520,678

WINDSHIELD CLEANER MECHANISM

Howard J. Findley, Shaker Heights, Ohio, assignor to Eaton Manufacturing Company, Cleveland, Ohio, a corporation of Ohio Application July 10, 1944, Serial No. 544,298

16 Claims. (Cl. 15—253)

This invention relates to windshield cleaner mechanisms and, as one of its objects, aims to provide an improved mechanism of this kind in which the windshield cleaner is operated from the vehicle driving motor in a highly satisfactory manner.

I am aware that various attempts have been made to operate windshield cleaners from the driving motors or engines of the vehicles served by such cleaners, but all of the proposed installations which have come to my attention are subject to the disadvantage that the cleaner is not driven at a constant speed but fluctuates widely in speed in accordance with variations in the speed of the vehicle driving motor. The present invention eliminates this disadvantage and, as another of its objects, provides a windshield wiper mechanism in which the cleaning device is driven from the vehicle motor and operates at a speed which is substantially constant for all motor speeds above a predetermined valve.

A further object of the present invention is to provide an improved windshield cleaner mechanism for a motor vehicle in which the cleaning device is driven from the vehicle motor at a substantially constant speed by the use of a substantially constant speed magnetic coupling.

Still another object of this invention is to provide an improved windshield cleaner mechanism of the character mentioned which embodies novel electrical control means including an automatic parking switch.

The invention can be further briefly summarized as consisting in certain novel combinations and arrangements of parts hereinafter described and particularly set out in the appended claims.

In the accompanying sheets of drawings,

Fig. 1 is a partial side elevation showing a vehicle having an auxiliary device and a windshield cleaner mechanism operated from the driving motor of the vehicle.

Fig. 2 is a view partly in section and more or less diagrammatic in form, further illustrating the mechanism of Fig. 1.

Fig. 3 is a partial side elevation showing another windshield cleaner mechanism driven from the vehicle motor.

Fig. 4 is a diagrammatic view partly in section further illustrating the windshield cleaner mechanism of Fig. 3.

Fig. 5 is a partial side elevation showing still another windshield cleaner mechanism driven from the vehicle motor, and Fig. 6 is a diagrammatic view partly in section further illustrating the windshield cleaner mechanism of Fig. 5.

The benefits of the present invention can be obtained with various different embodiments of my windshield cleaner mechanisms and a plurality of such embodiments are illustrated in the drawings and described in detail hereinafter. In the embodiment illustrated in Figs. 1 and 2 I show a motor vehicle 10 in the form of an automobile having a passenger or driving compartment 11 and an engine compartment 12. The compartment 11 is defined by the usual vehicle structure including a floor 13, a dashboard 14, a cowl 15, and a windshield 16. The compartment 11 also contains an instrument panel 17 located adjacent the base of the windshield 16.

The engine compartment 12 is located beneath the hood 18, which extends forwardly of the cowl 15, and is separated from the passenger compartment 11 by the dashboard 14. A vehicle driving motor 20 is located in the compartment 12 and may be a conventional expansible chamber motor such as a reciprocating or rotary internal combustion engine or it could be an internal combustion turbine. The driving motor 20 is provided with a cooling system including a conventional radiator 21 which is also contained in the compartment 12 and located adjacent the forward end of the driving motor. As shown in Fig. 1 the vehicle motor 20 is also provided at its forward end with a driven shaft or power take-off means 22.

The windshield cleaner mechanism illustrated in Figs. 1 and 2 includes a cleaning device 24 which is mounted on the vehicle at a point adjacent the windshield 16 and comprises one or more oscillating wipers 25 which are movable over the surface of the windshield 16 and a motion converting device 26 for actuating such wipers. The wipers 25 are mounted on fixed pivots 27 and the adjacent ends of the wiper arms are pivotally connected to one end of actuating link 28. The other end of the link 28 is pivoted to an arm 29 which is carried by a rotatable shaft 30 projecting from the device 26. Rotation of the shaft 30 and the arm 29 carried thereby causes oscillating movement to be transmitted through the link 28 for imparting a sweeping oscillation or reciprocating movement to the wipers 25.

The motion converting mechanism 26 comprises a closed lubricant-retaining housing 31 having a rotatable driving worm 32 therein and a worm gear 33 constantly in mesh with the worm and driven thereby. The worm 32 is connected with the outer or upper end of a flexible shaft 34 through which driving torque is transmitted to the cleaning device 24, as will be presently explained. The worm gear 33 is fixed on the shaft 30 which carries the actuating arm 29.

As indicated above, the windshield cleaning device 24 is driven from the vehicle motor 20 and this can be accomplished in various different ways which involve the use of a substantially constant speed coupling. This coupling is preferably a magnetic coupling 36, of an appropriate type or construction such as an eddy-current coupling, which enables the cleaning device 24 to be driven at a substantially constant speed for all operating speeds of the vehicle driving motor above a predetermined value.

In the apparatus illustrated in Figs. 1 and 2, the magnetic coupling 36 serves the windshield cleaning device 24 in a manner which will be presently explained in greater detail and also serves another auxiliary apparatus or device which in this instance is in the form of a vehicle ventilating and/or heating apparatus of the kind disclosed and claimed in copending application Serial No. 544,296, filed July 10, 1944, now Patent No. 2,445,392 granted July 20, 1948. This other auxiliary apparatus is here only briefly described and comprises an air impelling means such as a blower 38 of the centrifugal type which is driven from the power take-off 22 of the vehicle motor through the magnetic coupling 36. The blower 38 has an intake 39 extending forwardly of the radiator 21 and provided with a filter 40 and a valve 41 which is biased toward an open position by a tension spring 42. The blower 38 also has an air delivery means 43 extending therefrom to the passenger compartment 11 for discharging air into the latter. The air delivery means 43 may have a silencing means 43a therein and, if desired, may also include a heat exchanger for heating the air as shown in said copending application.

The magnetic coupling 36 comprises an outer member or housing 45 constructed of magnetic material and inner member or rotor 46 also constructed of magneic material. The rotor 46 is located in the housing 45 and carries a magnetizing coil or winding 47. The housing or input member 45 is mounted on suitable bearings 48 for rotation about the shaft 49 of the blower 38. The rotor or output member 46 is drivingly connected with the blower shaft 49 as by means of the pin 50.

The magnetic coupling 36 is designed to operate with continuous slippage between its housing and rotor members and which depends upon the extent of energization of the coil 47. This magnetic coupling forms a part of the driving means by which the blower 38 and the windshield cleaning device 24 are driven from the power take-off 22 of the vehicle motor 20. The rotatable housing 45 of the magnetic coupling can be connected with the power take-off 22 by any suitable torque transmitting means such as the belt 51 shown in this instance which extends around a pulley 52 of the power take-off means 22 and a pulley 53 carried by the housing of the magnetic coupling. While the vehicle motor 20 is in operation the housing 45 of the magnetic coupling is constantly driven at speeds which vary with the motor speed but the shaft 49 will be driven at a speed which is substantially constant for all speeds of the vehicle motor above a predetermined value.

To permit the cleaning device 24 to be rendered inoperative independently of the blower 38 the flexible driving shaft 34 is connected with the shaft 49 of the magnetic coupling 36 through a suitable clutch, preferably a solenoid clutch 55, as shown in this instance. The clutch 55 embodies a magnetizing winding or solenoid 56 and a pair of cooperating toothed clutch faces or elements 57 and 58. The clutch element 57 is carried by the outer end of the shaft 49 and the clutch element 58 is carried by a movable plunger 59 which is slidably splined on a stem 60 provided on the inner or lower end of the flexible shaft 34. A compression spring 61 embodied in the clutch 55 acts on the plunger 59 tending to urge the same in a retracted direction to disengage the clutch elements 57 and 58. When the winding 56 is energized in the manner which will be presently explained, the plunger 59 is shifted in opposition to the spring 61 to engage the clutch elements 57 and 58 and thereby establish a torque transmitting connection from the shaft 49 to the worm 32 of the cleaning device 24 through the flexible shaft 34.

Continuing with the description of the windshield cleaning device 24, it should be explained that this device embodies an automatic parking switch 63. This switch comprises stationary and movable contacts 63a and 63b carried, respectively, by stationary and movable arms 64a and 64b which are insulated from each other and from the housing 31. The movable arm 64b has a trip portion or finger 64c located to be intermittently engaged by the actuating arm 29 during the rotation of the latter by the shaft 30. Each engagement of the trip portion 64c by the arm 29 causes the contact arm 64b to be moved or flexed to cause opening of the contacts 63a and 63b of the parking switch 63.

It should also be explained at this point that the winding 47 of the magnetic coupling 36 can be energized through the use of a pair of slip rings 65 and 66 carried by the shaft 49 and with which a pair of brushes 65a and 66a cooperate.

For controlling the operation of the vehicle ventilating apparatus which includes the blower 38 and the operation of the windshield cleaning device 24, I provide a blower control 68 and a wiper control 69, both of which are mounted on the instrument panel 17 so as to be readily accessible for manual operation from the passenger or driving compartment 11. The blower control 68 comprises a pull rod 70 having an actuating knob 71 at its outer end and a stop or abutment member 72 at its inner end. The pull rod 70 also carries an electrical contact or finger 73 which cooperates with a resistor 74. The stop 72 is engaged by a thrust element 75 which is carried by the outer end of a flexible actuating shaft or wire 76 for the air intake valve 41. The lower end of the wire 76 is connected with an actuating arm 41a of the air intake valve 41 so that the action of the tension spring 42 urging the valve 41 toward its open position normally holds the element 75 against the stop 72. By withdrawing the pull rod 70 to its successive positions 71a, 71b and 71c the stop 72 is shifted to permit opening of the intake valve 41 by the spring 42 and the contact 73 is moved into engagement with or along the resistor 74 for energizing or varying the energization of the winding 47 of the magnetic coupling 36 through an electrical circuit which will be presently traced.

The wiper control 69 embodies a resistor 78, a curved solid contact 79 and a movable switch arm 80. This control also embodies a stationary contact 81 which is located adjacent to, but spaced from, the dead end of the resistor 78. The arm 80 is movable about a pivot 82 so as to sweep over the resistor 78 and the curved contact 79 and is shiftable into engagement with the stationary contact 81 by being disengaged from the curved contact 79 and the resistor 78.

Electric current of appropriate characteristics for energizing the magnetic coupling 36 and the solenoid clutch 55 can be obtained from any available source such as the storage battery 83 of the vehicle which has one side thereof grounded as indicated at 84. The other side of the battery 83 is connected with the movable arm 80 of the wiper control 69 through the conductors 85 and 86 and is also connected with the movable contact 64b of the parking switch 63 through the conductor 87. The conductor 85 may have a key controlled switch 88 therein which can be the conventional ignition switch of the vehicle. The resistor 74 of the blower control 68 is connected with the stationary contact 81 of the wiper control 69 by the conductor 89. The resistor 78 of the wiper control and the contact finger 73 of the blower control 68 are both connected with the brush 66a of the magnetic coupling 36 by the conductor 90 and its branches 90a and 90b. The solid curved contact 79 of the wiper control 69 and the stationary contact 63a of the parking switch 63 are both connected with the winding 56 of the solenoid clutch 55 by the conductor 91 and its branches 91a and 91b. The remote ends of the windings 56 and 47 of the solenoid clutch 55 and the magnetic couplings 36 are grounded as indicated respectively at 55a and 36a.

With the control means and circuit connections above described it will be seen that when operation of the winshield cleaning device 24 is desired, the arm 80 is shifted into engagement with the resistor 78 and the curved contact 79. This causes current from the battery 83 to be supplied to the magnetic coupling 36 through the conductors 90 and 90b and to the winding of the solenoid clutch 55 through the conductors 91 and 91a. The energization of the magnetic coupling causes the shaft 49 to be driven from the power take-off 22 of the vehicle motor and the energization of the solenoid clutch 55 causes the clutch elements 57 and 58 to be engaged for connecting the cleaning device 24 with the shaft 49. Movement of the arm 80 along the resistor 78 will vary the energization of the magnetic coupling and will produce a corresponding desired variation in the operating speed of the windshield cleaning device 24. When the operation of the windshield cleaner is no longer desired, the arm 80 is shifted out of engagement with the resistor 78 and the curved contact 79 but the operation of the cleaning device is not immediately stopped inasmuch as the parking switch 63 then acts as a holding switch for temporarily maintaining the solenoid clutch 55 energized. As soon as the actuating arm 29 of the cleaning device 24 engages the trip portion 64c of the parking switch, the contacts 63a and 64b are opened to thereby de-energize the solenoid clutch and discontinue the operation of the wipers 25 leaving the latter in a parked position.

During the operation of the ventilating apparatus under the control of the blower control 68, movement of the knob 71 to its first position 71a permits opening of the intake valve 41 but at this time the contact 73 does not yet engage the resistance 74 and the magnetic coupling 36 remains unenergized. The opening of the intake valve 41 permits air to be supplied to the compartment 11 as the result of the forward motion of the vihicle. When the knob 71 is withdrawn further to either of its positions 71b or 71c the resistance 74 is engaged by the contact 73 thereby energizing the magnetic coupling 36 and causing the blower 38 to be driven at a speed depending upon the point of engagement of the contact 73 with the resistance 74.

It is important to note that the resistance 74 is connected with the battery 83 through the wiper control 69 so that the current which is supplied to the magnetic coupling through the blower control 68 must first pass through the wiper control 69. These circuit connections enable the wiper control to dominate or overrule the blower control 68 so far as the energization of the magnetic coupling 36 is concerned. Whenever the windshield cleaner 24 is being operated it is desirable that the speed of the wipers 25 be subject to the control of the operator of the vehicle and not be influenced by or dependent upon the operation of the ventilating apparatus. For this reason the current for energizing the magnetic coupling 36 is supplied to the blower control 68 through the wiper control 69 so that whenever the cleaning device 24 is put into operation the wiper control 69 will overrule the blower control 68. During the time that the arm 80 of the wiper control 69 is in engagement with the contact 81, the ventilating apparatus can be controlled for its full range of operation by means of the knob 71. However, whenever the windshield cleaning device 24 is put into operation by movement of the arm 80 into engagement with the resistance 78 the energization of the magnetic coupling 36 is then taken over by the wiper control 69 and so long as the cleaning device 24 remains in operation the blower 38 can be operated only at a speed such as the magnetic coupling 36 will give for the particular setting at which the movable arm 80 is then placed.

In the form of the windshield cleaning mechanism illustrated in Figs. 3 and 4, I show a windshield cleaning device 93 which is substantially identical with the device 24 above described but which is driven from a shaft extension 94 of the electric generator 95 of the motor vehicle 96. The windshield cleaner 93 is connected with the generator shaft 94 by a flexible shaft 97 and a magnetic coupling 98, the latter being substantially identical with the magnetic coupling 36 above described.

As shown in Fig. 4 the outer member or housing 99 of the magnetic coupling is pinned or otherwise connected to the generator shaft 94 and the rotor or inner member 100 of the coupling is mounted for rotation about this shaft and is connected with the flexible shaft 97 by means of the stem or rotor extension 101. Energizing current can be supplied to the winding 102 of the magnetic coupling through a pair of slip rings 103 and 104 carried by the rotor extension 101 and with which the brushes 103a and 104a cooperate respectively. The rotor extension 101 is supported for rotation in part by the rotor 100 and in part by a stationary cup-shaped housing member 105 carried by a bracket 106 which is suitably supported as by being connected with the housing of the generator 95.

The windshield cleaner 93 embodies a parking switch 108 which is similar to the parking switch 63 above described and the operation of the cleaning device is controlled from the passenger compartment 109 of the vehicle by means of a wiper control 110 located on the instrument panel 111. The control 110 comprises a resistor 112, a stationary contact 113 adjacent to but spaced from the dead end of the resistor and a movable switch arm 114 which is connected with the storage battery 115 through a key controlled switch 116. One end of the resistor 112 is connected with the brush 104a of the magnetic coupling 98 by a conductor 117 and is also connected with one of the contacts of the parking switch 108 by the conductor 118. The other contact of the parking switch is connected with the stationary contact 113 by the conductor 119.

When operation of the windshield cleaning device 93 is desired the switch arm 114 is moved into engagement with the resistor 112 to thereby energize the magnetic coupling 98. The windshield cleaner will then be driven from the generator shaft 94 at a speed which is substantially constant for all speeds of the vehicle motor 96a which are above a predetermined value. The speed of the windshield cleaner can be varied by shifting the position of the switch arm 114 on the resistance 112 so as to correspondingly vary the energization of the magnetic coupling 98. When operation of the windshield cleaner is to be discontinued, the switch arm 114 is returned to the stationary contact 113 but the windshield cleaner does not immediately come to a stop. When the switch arm 114 has been shifted to the stationary contact 113 the energizing circuit for the magnetic coupling 98 then extends through the parking switch 108 and the opening of this switch by the actuating arm 120 of the cleaning device causes the magnetic coupling to be de-energized and the cleaning device comes to a stop leaving the wipers 121 thereof in a parked position.

In the form of the invention illustrated in Figs. 5 and 6 I show a windshield cleaning device 125 substantially identical with those above described and being driven from a power take-off 126 of the vehicle driving motor 127 through a magnetic coupling 128, the latter being substantially identical with the magnetic coupling 36 above described. The magnetic coupling 128 is connected with the windshield cleaner 125 through a flexible shaft 129 and the outer member or housing of the coupling is driven directly from the power take-off 126 through a suitable torque-transmitting means such as the belt 130.

The cleaning device 125 embodies a parking switch 131 which is electrically connected with a wiper control means 132 located on the instrument panel 133 in the driving or passenger compartment of the vehicle. The wiper control 132 comprises a resistor 135, a stationary contact 136 spaced from one end of the resistor and a movable switch arm 137. The control 132 is similar to the control 110 described above except that the resistor 135 has one end thereof connected with the battery 138 through the key-controlled switch 139 and its other end connected with one of the contacts of the parking switch 131. The other contact of the parking switch 131 is connected with the stationary contact 136.

When operation of the windshield cleaner 125 is desired, the switch arm 137 is moved into engagement with the resistor 135 to thereby energize the magnetic coupling 128. This will cause the cleaning device 125 to be driven from the power take-off 126 of the vehicle motor 127 at a speed which is substantially constant for all motor speeds coming within the usual driving range of the vehicle. The speed of operation of the cleaner can be varied by shifting the arm 137 along the resistor 135 to correspondingly vary the energization of the magnetic coupling. When operation of the cleaning device 125 is to be discontinued, the switch arm 137 is shifted to the stationary contact 136 and the subsequent opening of the parking switch 131 de-energizes the magnetic coupling and stops the cleaning device with the wipers 140 thereof in a parked position.

In the foregoing detailed description of my windshield wiper mechanisms it has been stated that the windshield cleaning devices are driven at a substantially constant speed and, while this is usually desirable, there may be certain installations or conditions where it would be desirable to have the speed of the cleaning device increase somewhat as the speed of the engine and vehicle is increased. One reason why such an increase in the speed of cleaning device might be desirable is that during travel of the vehicle at higher speeds a greater amount of snow or rain strikes the windshield and is required to be wiped or cleaned therefrom. Such an increase in the speed of the cleaning device can be obtained by suitably varying the characteristics of the magnetic coupling. It should therefore be understood that in speaking of a substantially constant speed for the cleaning device it is contemplated that a small increase in speed with increased speed of operation of the engine and vehicle can be tolerated or may even be desirable.

From the foregoing description and the accompanying drawings it will now be readily understood that the present invention provides improved windshield cleaner mechanisms in which a windshield cleaning device is driven from the vehicle motor but operates at a speed which is substantially constant for all motor speeds above a predetermined value.

While I have illustrated and described my improved windshield wiper mechanisms in considerable detail, it will be understood, of course, that I do not wish to be correspondingly limited, but regard my invention as including all changes and modifications coming within the spirit of the invention and the scope of the appended claims.

Having thus described my invention, I claim:

1. A windshield cleaner mechanism for a vehicle having a windshield and a variable speed driving motor provided with a power take-off, comprising a wiper movable over said windshield, motion converting means for causing oscillation of said wiper, a magnetic coupling operable with slippage when energized, means for electrically energizing the magnetic coupling, said magnetic coupling having a variable speed rotatable input member connected with said power take-off and a rotatable output member controllable to a substantially constant speed through the control energization of the magnetic coupling, and means connecting said motion converting means with said output member.

2. A windshield cleaner mechanism for a vehicle having a windshield and a variable speed driving motor provided with a power take-off, comprising a wiper movable over said windshield, motion converting means for causing oscillation of said wiper, a magnetic coupling operable with slippage when energized, means for electrically energizing the magnetic coupling, said magnetic coupling having a variable speed rotatable input member connected with said power take-off and a rotatable output member controllable to a substantially constant speed through the control energization of the magnetic coupling, and a flexible shaft connecting said motion converting means with said output member.

3. A windshield cleaner mechanism for a vehicle having a passenger compartment provided with a windshield and a variable speed driving motor provided with a power take-off, comprising a wiper movable over said windshield, motion converting means for oscillating said wiper, means connecting said motion converting means with said power take-off including a magnetic coupling operable with continuous slippage when energized, an energizing circuit for said magnetic coupling, and control means connected in said circuit and operable from said compartment for controlling the energization of said magnetic coupling so as to vary the speed of oscillation of said wiper.

4. A windshield cleaner mechanism for a vehicle having a passenger compartment provided with a windshield and a variable speed driving motor provided with a power take-off, comprising a wiper movable over said windshield, mechanism driven by said motor including a substantially constant speed magnetic coupling operable with continuous slippage and connected with said power take-off for actuating said wiper at a selected substantially constant speed for all operating speeds of said motor above a predetermined value, a circuit for energizing said coupling, and control means connected in said circuit and operable from said passenger compartment for varying the energization of the coupling to correspond with said selected substantially constant speed for the wiper.

5. A windshield cleaner mechanism comprising an oscillating wiper, a motion converting means for oscillating said wiper, a power source including a variable speed power device and a rotary shaft driven thereby, a rotary magnetic coupling connecting said motion converting means with said rotary shaft and being operable with continuous slippage, a parking switch adapted to be actuated intermittently by said motion converting means for controlling the parking of said wiper, a source of energizing current, a manually operable switch device including a resistance for varying the energization of said magnetic coupling, and circuit connections connecting said magnetic coupling and said parking switch with said switch device and enabling the latter to control the energization of said magnetic coupling either through said resistance or through said parking switch.

6. A windshield cleaner mechanism comprising an oscillating wiper, a motion converting means for oscillating said wiper, a power source including a variable speed power device and a rotary shaft driven thereby, a rotary magnetic coupling connecting said motion converting means with said rotary shaft and being operable with continuous slippage, a parking switch adapted to be actuated intermittently by said motion converting means for controlling the parking of said wiper, a source of energizing current, a switch device embodying a resistance and a fixed contact spaced therefrom and a control contact manually movable to positions engaging either said resistance or said fixed contact, and circuit connections connecting said magnetic coupling and said parking switch with said resistance and fixed contact and enabling said switch device to control the energization of said magnetic coupling either through said resistance or through said parking switch.

7. A windshield cleaner mechanism for a vehicle having a windshield and also having an auxiliary device to be driven and a variable speed driving motor provided with a power take-off, comprising a wiper movable over said windshield, motion converting means for causing oscillation of said wiper, a rotary magnetic coupling connected with said power take-off and being operable with continuous slippage, said auxiliary device being connected with said magnetic coupling, means connecting said motion converting means with said magnetic coupling including a solenoid clutch, a parking switch adapted to be actuated intermittently by said motion converting means for controlling the parking of said wiper, a source of energizing current, a manually operable switch device including a resistance for varying the energization of said magnetic coupling, and circuit connections connecting said magnetic coupling, solenoid clutch and parking switch with said switch device and enabling the latter to control the energization of said magnetic coupling either through said resistance or through said parking switch and also enabling said switch device to control the energization of said solenoid clutch.

8. A windshield cleaner mechanism for a vehicle having a windshield and also having an auxiliary device to be driven and a variable speed driving motor provided with a power take-off, comprising a wiper movable over said windshield, motion converting means for causing oscillation of said wiper, a magnetic coupling operable with slippage when energized and forming a common driving connection from said power take-off for said auxiliary device and said motion converting mechanism, said magnetic coupling having a variable speed rotatable input member connected with said power take-off and a substantially constant speed rotatable output member with which said auxiliary device and said motion converting mechanism are connected, and means for electrically energizing said magnetic coupling.

9. A windshield cleaner mechanism for a vehicle having a windshield and also having an auxiliary device to be driven and a variable speed driving motor provided with a power take-off, comprising a wiper movable over said windshield, motion converting means for causing oscillation of said wiper, a magnetic coupling operable with slippage when energized and forming a common driving connection from said power take-off for said auxiliary device and said motion converting mechanism, said magnetic coupling having a variable speed rotatable input member connected with said power take-off and a substantially constant speed rotatable output member with which said auxiliary device is connected, means connecting said motion converting mechanism with said output member including a solenoid clutch, means for electrically energizing said magnetic coupling, and means for electrically energizing said solenoid clutch.

10. A windshield cleaner mechanism for a vehicle having a windshield and also having an auxiliary device to be driven and a variable speed driving motor provided with a power take-off, comprising a wiper movable over said windshield, motion converting means for causing oscillation of said wiper, means connecting said auxiliary device with said motor to be driven thereby including a substantially constant speed magnetic coupling adapted to operate with continuous slippage while energized, means operably connecting said motion converting mechanism with said magnetic coupling including a solenoid clutch, and means for electrically energizing said magnetic coupling and said solenoid clutch.

11. A windshield cleaner mechanism for a vehicle having a windshield and also having an auxiliary device to be driven and a variable speed driving motor provided with a power take-off, comprising a wiper movable over said windshield, motion converting means for causing oscillation of said wiper, means connecting said auxiliary device with said motor to be driven thereby including a substantially constant speed magnetic coupling adapted to operate with continuous slippage while energized, means operably connecting said motion converting mechanism with said magnetic coupling including a solenoid clutch, and electric circuit connections for energizing said magnetic coupling and solenoid clutch and including a control means for controlling the operation of said auxiliary device and a control means for controlling the operation of said wiper, said circuit connections being such that actuation of the control means for said wiper renders the control means for said auxiliary device ineffective.

12. A windshield cleaner mechanism for a vehicle having a passenger compartment provided with a windshield and also having an auxiliary device to be driven and a variable speed driving motor provided with a power take-off, comprising a wiper movable over said windshield, motion converting means for causing oscillation of said wiper, a magnetic coupling operable with slippage when energized and having a variable speed rotatable input member and a substantially constant speed rotatable output member, said auxiliary device being connected with said output member, means connecting said motion converting mechanism with said output member including a solenoid clutch, and electric circuit connections for energizing said magnetic coupling and solenoid clutch and including a control means manually operable from said passenger compartment for controlling the operation of said auxiliary device and a control means manually operable from said passenger compartment for controlling the operation of said wiper, said circuit connections being such that the actuation of the control means for said wiper renders the control means for said auxiliary device ineffective.

13. A windshield cleaner mechanism for a vehicle having a windshield and a variable speed driving motor and also having an electric generator connected at one end thereof with said motor and provided at its other end with a power take-off, comprising a wiper movable over said windshield, motion converting means for oscillating said wiper, a magnetic coupling operable with slippage when energized, means for electrically energizing said magnetic coupling, said magnetic coupling having a variable speed rotatable input member connected with the power take-off of said generator and a rotatable output member controllable to a substantially constant speed through the control energization of the magnetic coupling, and means connecting said motion converting means with said output member.

14. A windshield cleaner mechanism for a vehicle having a variable speed driving motor and a compartment provided with a windshield and also having an electric generator connected at one end thereof with said motor and provided at its other end with a power take-off, comprising a wiper movable over said windshield, motion converting means for oscillating said wiper, means connecting said motion converting means with the power take-off of said generator including a magnetic coupling operable with continuous slippage when energized, an energizing circuit for said magnetic coupling, and control means connected in said circuit and operable from said compartment for controlling the energization of said magnetic coupling so as to vary the speed of oscillation from said wiper.

15. A windshield cleaner mechanism for a vehicle having a variable speed driving motor and a compartment provided with a windshield and also having an electric generator connected at one end thereof with said motor and provided at its other end with a power take-off, comprising a wiper movable over said windshield, mechanism driven by said motor including a substantially constant speed magnetic coupling operable with continuous slippage and connected with the power take-off of said generator for actuating said wiper at a selected substantially constant speed for all operating speeds of said motor above a predetermined value, a circuit for energizing said coupling, and control means connected in said circuit and operable from said compartment for varying the energization of the coupling to correspond with said selected substantially constant speed for the wiper.

16. A windshield cleaner mechanism for a vehicle having a windshield and a variable speed driving motor and also having an electric generator connected at one end thereof with said motor and provided at its other end with a power take-off, comprising a wiper movable over said windshield, motion converting means for oscillating said wiper, a rotary magnetic coupling connecting said motion converting means with the power take-off of said generator and being operable with continuous slippage, a parking switch adapted to be actuated intermittently by said motion converting means for controlling the parking of said wiper, a source of energizing current, a manually operable switch device including a resistance for varying the energization of said magnetic coupling, and circuit connections connecting said magnetic coupling and said parking switch with said switch device and enabling the latter to control the energization of said magnetic coupling either through said resistance or through said parking switch.

HOWARD J. FINDLEY.

REFERENCES CITED

The following references are of record in the file of this patent:

UNITED STATES PATENTS

| Number | Name | Date |
| --- | --- | --- |
| 756,536 | Holz | Apr. 28, 1903 |
| 1,259,861 | Henry | Mar. 19, 1918 |
| 1,534,276 | Locklin | Apr. 21, 1925 |
| 1,797,073 | Chaffin | Mar. 17, 1931 |
| 2,223,660 | Horton | Dec. 3, 1940 |
| 2,243,016 | Pritchard | May 20, 1941 |
| 2,287,953 | Winther | June 30, 1942 |
| 2,332,123 | Whitted | Oct. 19, 1943 |

FOREIGN PATENTS

| Number | Country | Date |
| --- | --- | --- |
| 545,975 | England | June 22, 1942 |